United States Patent
Blankenship et al.

(10) Patent No.: US 6,267,291 B1
(45) Date of Patent: Jul. 31, 2001

(54) CODED AND ELECTRONICALLY TAGGED WELDING WIRE

(75) Inventors: George D. Blankenship, Chardon; Christopher Hsu, Mentor, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/336,574

(22) Filed: Jun. 21, 1999

(51) Int. Cl.$^7$ .............................. G06F 17/00; G06K 19/06
(52) U.S. Cl. .......................... 235/375; 235/493; 235/494; 219/136
(58) Field of Search .................................. 235/375, 449, 235/494, 462.13; 219/60 R, 61, 121.13, 130.5, 137 R, 137 PS

(56) References Cited

U.S. PATENT DOCUMENTS

| | | |
|---|---|---|
| 3,581,050 | 5/1971 | Brown et al. . |
| 3,581,051 | 5/1971 | Brown . |
| 4,000,374 | 12/1976 | De Keyser . |
| 4,415,792 | 11/1983 | Jordan . |
| 4,527,045 | 7/1985 | Nakajima et al. . |
| 4,587,407 | 5/1986 | Ahmed et al. . |
| 4,608,482 | 8/1986 | Cox et al. . |
| 4,767,913 | 8/1988 | Weber et al. . |
| 4,791,284 | 12/1988 | Ludden . |
| 4,879,457 | 11/1989 | Ludden . |
| 4,960,983 | 10/1990 | Inoue . |
| 4,976,179 | 12/1990 | Lacrouts-Cazenave . |
| 5,151,684 | 9/1992 | Johnsen . |
| 5,278,390 | 1/1994 | Blankenship . |
| 5,481,100 | 1/1996 | Terauchi . |
| 5,497,140 | 3/1996 | Tuttle . |
| 5,500,512 | 3/1996 | Goldblatt ............................ 235/375 |
| 5,553,810 | 9/1996 | Bobeczko . |
| 5,583,819 | 12/1996 | Roesner et al. . |
| 5,692,700 | 12/1997 | Bobeczko . |
| 5,981,906 | * 11/1999 | Parker ............................ 235/137 PS |
| 6,002,104 | * 12/1999 | Hsu ................................ 219/137 PS |
| 6,091,048 | 7/2000 | Lanouette et al. . |

OTHER PUBLICATIONS

Motorola, "BiStatix™ A Breakthrough Solution for Automated Data Capture" brochure, 6 pages, undated.

Motorola Indala Corporation; "Indala Industrial Products" catalog; 1998; 6 pages plus cover and back.

Motorola; "Electro–Magnetic RFID: Everything You Need to Know About Inductively Coupled RFID" brochure; 1999; 20 pages plus cover.

Texas Instruments; "Tiris™ Radio Frequency Identification Solutions" brochure; undated; 6 pages plus cover and back.

Dallas Semiconductor Corporation; "50 Ways to Touch Memory" (Third Edition) magazine; 1994; 92 pages plus front and back covers.

* cited by examiner

*Primary Examiner*—Karl D. Frech
*Assistant Examiner*—Larry D Taylor
(74) *Attorney, Agent, or Firm*—Vickers, Daniels & Young

(57) ABSTRACT

Information pertaining to characteristics of metal welding electrode wire and which characteristics are useful in connection with adjusting welding parameters in an arc welding process and/or selecting between operating modes in a welding system are encoded on welding wire and/or on other memory components such as bar code labels and tags, RFID cards and tags, IC cards, and Touch Memory buttons, and the memory device is scanned prior to and/or at the point of use of the welding wire for enabling tracking of product distribution, manual and/or automatic selection of an operating mode for the welding system, manual and/or automatic adjustment of welding parameters in a given operating mode, consumables inventory, and the like.

39 Claims, 11 Drawing Sheets

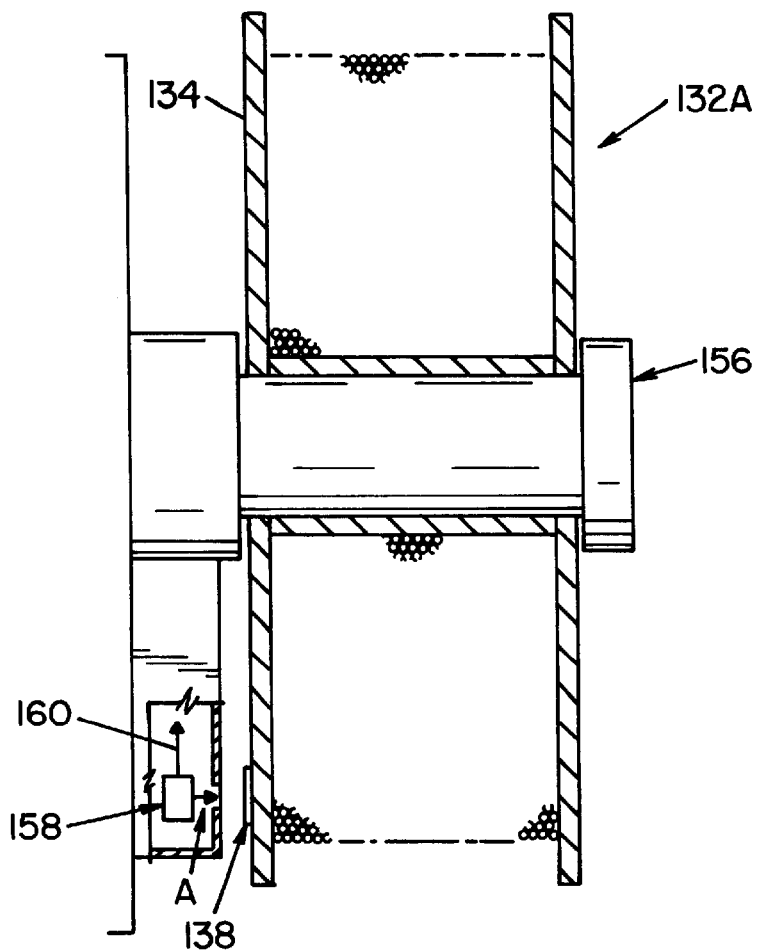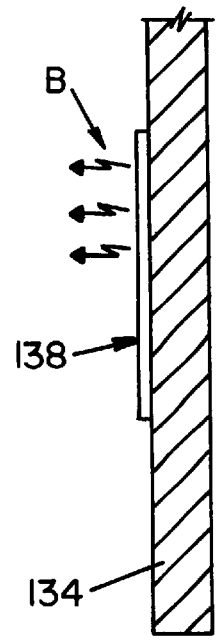
FIG. 13  FIG. 13A
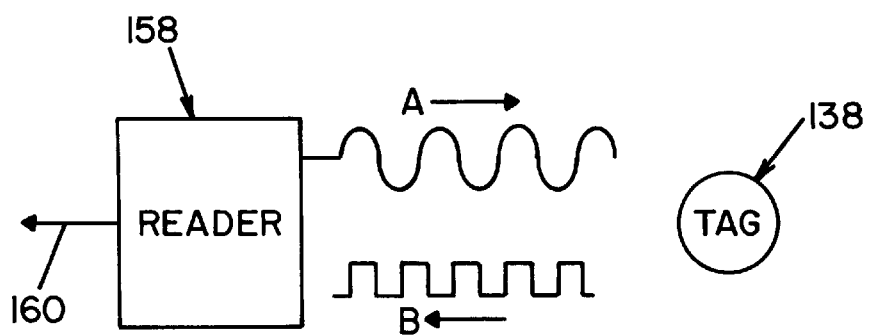
FIG. 13B

CODED AND ELECTRONICALLY TAGGED WELDING WIRE

BACKGROUND OF THE INVENTION

This invention relates to the art of welding and, more particularly, to the encoding of metal welding wire with information pertaining thereto, and to the control of automatic or semi-automatic welding apparatus and processes based on the information extracted from a coded welding wire or from other electronically readable information storage devices encoded with information pertaining to a given welding wire.

The present invention is particularly applicable to the encoding and use of coded filler wire and other electronically readable information storage devices in connection with controlling automatic or semiautomatic arc welding apparatus and processes based on information pertaining to the welding wire. Accordingly, the invention will be described with reference to such welding wire information and the storage and use thereof in conjunction with manual and/or automatic control of a welding process or apparatus. Incorporated herein by reference for background information is U.S. Pat. No. 5,692,700 to Bobeczko which is assigned to the assignee of the present application and which discloses the provision of a bar code on a cover and/or reel to identify the type and size of the welding wire on the reel.

Electric arc welding is a complicated process wherein numerous interrelated and non-interrelated parameters affect the deposition of molten metal to a weld pool in performing a welding operation. One such parameter is the welding wire to be used and, in particular, information pertaining thereto which is useful, for example, in determining processes and apparatus in which its use is best suited and processes and/or apparatus operating parameters for a given wire. Other information, such as the date and time of manufacture, the manufacturing location and the like, can assist in tracing the origin of the wire should a problem occur requiring contact with the manufacturer. Further, information such as the alloy type, wire diameter, control numbers, lubrication levels, and the like is valuable for controlling a given process or apparatus so as to optimize performance and weld quality.

In particular, the quality of automated welding is significantly affected by variations in the welding wire diameter which can vary by +/−0.001 inch and still be within welding wire specifications, and such a variation can change the deposition rate by as much as six percent for 0.035 inch diameter wire. Welding wire is drawn, and such diameter variations result from a manufacturer's efforts to fully extend the life of a die by starting with a die that produces slightly undersized wire within a given specification. The die progressively wears during production, whereby the wire size gradually increases and eventually becomes oversized with respect to the specification. While it is possible to tightly control the wire diameter during production such as by frequent replacement of dies, such production for most practical purposes is economically unacceptable. Another major factor affecting weld quality is a variation in the proportion of major to minor gases in the shielding gas mixture for GMAW or MIG welding. The variation of the proportion of the minor gas from a given standard therefore can significantly alter the heat input and thus the weld size, shape and quality.

SUMMARY OF THE INVENTION

In accordance with the present invention, information pertaining to metal welding wire of the foregoing character is magnetically encoded thereon and/or in or on other electrically or electronically readable devices or components such as RFID (radio frequency identification) cards or tags, bar code labels or tabs, ROM, IC (integrated circuit) plates or boards, Touch Memory buttons, and the like. Touch Memory is a registered trademark of Dallas Semiconductor Corporation of Dallas, Tex.

The information pertaining to the welding wire can be in a number of different categories including, for example, generic or fixed information such as the product name and/or trademark, the package type, and the like, and information relevant to the welding wire coiled on a given reel or in a given barrel, such as the alloy chemistry thereof, the weight and/or length of the coiled wire, the date, time and location at which a wire was manufactured, personnel responsible for the manufacturer, and the like. Still another category can be variable information such as the diameter of the wire at locations therealong, the surface condition of the wire, winding or twisting conditions, out-of-roundness of the wire, the location of anomalies such as breaks in the wire, the globular to spray break over voltage, personnel changes during manufacturing, and the like. In addition to encoding information of the foregoing character at the time of manufacturer of the wire, it is also contemplated in accordance with the invention that there can be a write back of information to be recorded at the time of use of the wire, such as the date and time of use so as to enable maintaining a log of usage, and the amount used so as to enable identification of a location in the coil relative to the beginning and terminal ends of the wire.

The encoded information can be extracted prior to use and/or in connection with use of the wire in given welding apparatus. When extracted prior to use, the information enables an operator to manually make the necessary preliminary adjustments of the control system for the welding apparatus for obtaining optimum performance thereof, and/or to select between two or more operating modes. With respect to the encoding of information pertaining to the wire diameter, for example, the diameter can be encoded at predetermined intervals along the length of the wire as it is being manufactured, and the extracting of such information prior to initiating operation of the apparatus enables the operator to adjust parameters of the process or to anticipate times in the process where a parameter such as the speed of the wire feeding device needs to be adjusted, so as to maintain a desired deposition rate in response to diameter variations along the length of the wire. When the encoded information is extracted from the wire or other storage device in connection with the operation of the welding apparatus, the extracted information can be used to automatically configure the control system by adjusting an appropriate parameter or parameters for optimizing the apparatus performance, or to automatically switch between different operating modes of the apparatus such as the spray arc and pulsed arc welding modes mentioned above. Such operating modes are given by way of example only, and many other modes of operation can be selected between depending on the particular welding apparatus and/or process with which the principals of the present invention are used. Likewise, the parameter of wire feed speed is given by way of example only, and it will be appreciated that many other parameters can be controlled and/or adjusted using the principals of the present invention such as, arc voltage, arc current, wave shape, arc length or gap, and gas flow rate to name but a few.

Preferably, encoding on the welding wire or on or in other information storage devices is achieved as the welding wire is drawn during the manufacturing process and, in connection with encoding information on the welding wire, it can be achieved by imprinting magnetic pulses thereon. The encoding on the wire may also be achieved by Manchester encoding or MFM (modified frequency modulation) and at the point of use, the coded information may be read from the wire such as by using Hall Effect, inductive pickup coil technology or a magneto resistive method, after which the code is deciphered and the extracted information visually inspected such as on a video screen, and/or recorded and/or transmitted to the welding apparatus to achieve the foregoing control or switching functions. When reading the wire in conjunction with the operation of welding apparatus, the reading can be accomplished, for example, at the wire feeding device.

As mentioned above, the desired information pertaining to electrode wire can also be encoded in a Touch Memory button, on a RFID card or tag, or on a bar code label or tag which would be scanned at the location of the welding apparatus by appropriate electronic reading devices. A Touch Memory button is a semiconductor memory chip enclosed in a stainless steel canister measuring, for example, about 16 millimeters in diameter and having a height between about three and six millimeters. It can be adhesively or otherwise mounted on an object, such as a welding wire reel or barrel and can read or write in response to a momentary contact. The memory chip is stimulated by a five volt signal through a single wire contact and ground.

An RFID system is similar in application to bar code technology, but uses radio frequency rather than optical signals. The system comprises two major components, namely a reader and a memory tag or card, and these components work together to provide a non-contact type of information retrieval. In this respect, the reader produces a radio frequency magnetic field which is transmitted from the reader by an antenna, and the RFID card or tag contains an antenna which receives the magnetic field signal from the reader and an integrated circuit which converts the incoming signal to an electrical form. The integrated circuit memory contents are transmitted as an electromagnetic signal back to the reader wherein the signal is converted back into an electrical form after which the data is decoded and transmitted to a host computer system. RFID systems can be read only or read/write, and the tag can be either active or passive. An active tag includes a battery to produce a stronger electromagnetic return signal to the reader which increases the extent of the transmission distance between the tag and reader, and RFID systems do not require a direct contact with or a direct line of sight with the reader and are well suited for use in harsh environments. In contrast, bar code and Touch Memory systems require a relatively clean environment because they rely on optics and direct contact with the encoded component of the system.

Regardless of the information storage system used, scanning for the stored information can take place either prior to or in connection with operation of the welding apparatus to facilitate the foregoing manual or automatic adjustment of the apparatus and thus the welding process so as to manually or automatically provide a welding procedure commensurate with characteristics of the electrode. Again, such encoded information enables the manual or automatic adjustment of the apparatus prior to and/or during operation thereof to, for example, compensate for variations in the characteristics of the electrode. Additionally, the stored information preferably includes data relevant to tracking, product distribution, usage, and the like which can be retrieved at any time for maintaining corresponding records including, at the point or points of usage, an inventory of the quantity of available wire.

It is accordingly an outstanding object of the present invention to provide a method and system for controlling the operation of electric arc welding processes using consumable welding wire based on encoded information pertaining to the wire and extracted at the point of use for selecting between modes of operation and/or controlling operation of a welding process based on the extracted information.

Another object is the provision of a method and system of the foregoing character in which operating parameters of welding apparatus can be adjusted during operation thereof in response to extracted information pertaining to the welding wire and/or the apparatus can be shifted between different operating modes based on the extracted information.

A further object of the invention is to provide a method of encoding metal welding wire with information pertaining to characteristics thereof and/or with information pertaining to operating parameters of a welding process with which the wire can be used.

Yet another object is the provision of welding wire having information magnetically encoded thereon pertaining thereto.

Another object is the provision of an information storage system for welding wire by which a wire manufacturer can track wire production and finished goods inventory and by which a wire consumer can track wire usage and raw material inventory.

Yet a further object is the provision of a system of encoding information relating to welding wire which enables error detection by a consumer to preclude use of the wrong welding wire in connection with a particular welding process.

Still another object is the provision of a method of controlling an electric arc welding process based on information encoded on welding wire used in the process.

A further object is the provision of a system for controlling the operation of electric arc welding apparatus based on information encoded on welding wire used with the apparatus.

Yet another object is the provision of a method of operating an electric arc welding process in one of two operating modes and switching between the modes based on information encoded on welding wire used in the process or encoded in or on electronically readable storage devices separate from the wire per se.

Still a further object is the provision of an improved method of maintaining an inventory of consumables in connection with an arc welding process.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 13 is a sectional elevation view illustrating the positional relationship between an RFID tag on a reel of welding wire and the tag reader;

FIG. 13A is an enlarged sectional elevation view of the portion of the reel in FIG. 13 on which the RFID tag is mounted;

FIG. 13B schematically illustrates the signal transmitting and receiving functions of the reader and tag;

DESCRIPTION OF PREFERRED EMBODIMENTS

Figure 1:
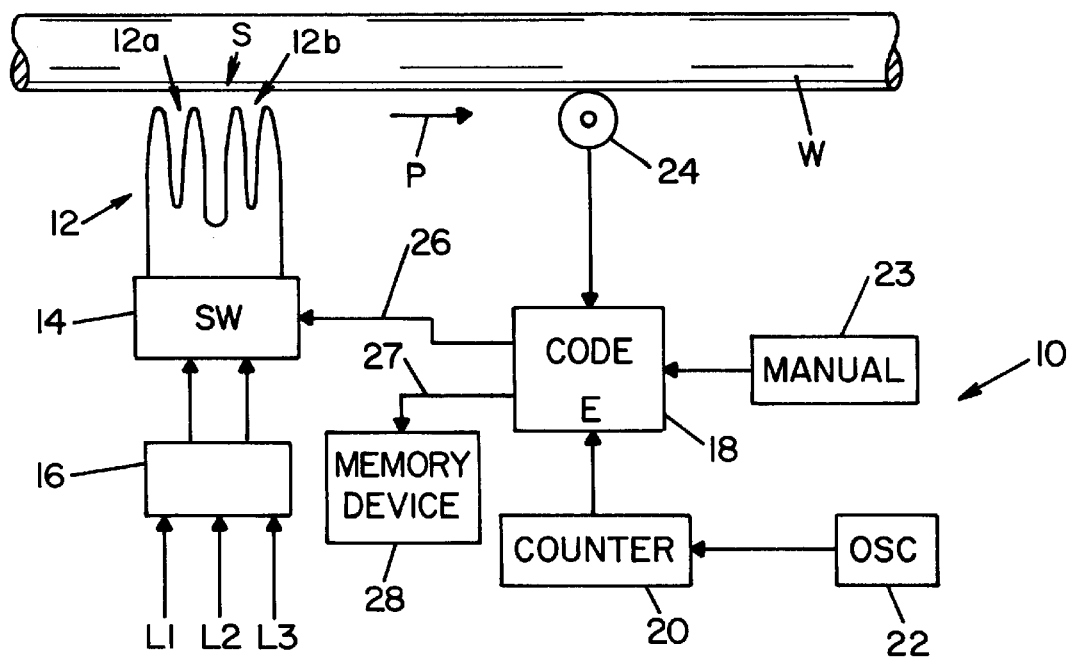
FIG. 1 schematically illustrates apparatus for magnetically imprinting coded information on metal welding electrode wire.

Referring now in greater detail to the drawings, wherein the showings are for the purpose of illustrating preferred embodiments of the invention only and not for the purpose of limiting the invention, FIG. 1 illustrates a section of metal welding wire W which is of indeterminate length and, in connection with the manufacture thereof, is drawn and wrapped onto a spool or reel. In use, as will become apparent hereinafter, the reel is mounted on welding apparatus in association with a wire feeding device by which the wire is payed from the reel and fed to the welding station of the apparatus. As the wire is drawn in connection with the manufacturing process, it is moved along a path as indicated by arrow P in FIG. 1 and, in accordance with the present invention, relative to an encoding unit 10 provided along the path and which includes a writing component 12 at an encoding station S along path P. In this embodiment, writing component 12 is shown as an inductor coil having adjacent reversely wound coil portions 12a and 12b adjacent which wire W passes in moving along path P, and the encoding unit 10 further includes a switch 14 for connecting and disconnecting the inductor coil with a suitable AC power source designated by lines L1, L2 and L3 through a rectifier 16. A code to be imprinted on wire W is stored in an encoder component 18 of encoding unit 10, and the latter further includes a counter 20 which, as will become apparent hereinafter, sets the time between sequential codes imprinted on wire W, and an oscillator 22 which provides a timer for actuating counter 20.

Encoder 18 provides a predetermined menu of information and, preferably, information pertaining to wire W in addition to the information in encoder 18 can be encoded on a wire at selected times during the manufacturing procedure with respect to a given coil of wire by inputting such additional information through encoder 18 via a selectively operable writing device 23. Such additional information can, for example, be information pertaining to variables and/or anomalies occurring during the manufacturing process such as variations in the diameter of the wire and the surface condition thereof, a break or breaks in the wire, a change of personnel operating the production machinery, and the like. The information which is stored in encoder 18 on the other hand is information which does not vary in connection with a given production run and which, accordingly, can include such information as the manufacturers name and location, a product designation, a specified wire diameter, the electrode composition, and the like.

A controller 24 senses the movement of wire W along path P and operates to control stopping and starting of the encoding unit so that the latter is active only when wire W is being moved along path P. Controller 24 also operates to provide input to encoder 18 for imprinting encoded information on wire W relative to tracking the wire between the beginning and terminal ends thereof and enabling, for example, providing preselected intervals of length along the wire at which the diameter of the wire is to be determined and recorded.

Figure 2A:
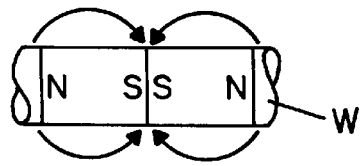
FIGS. 2A and 2B illustrate different magnetic imprints of magnetic pulses on the electrode wire using the apparatus of FIG. 1.
Figure 2B:
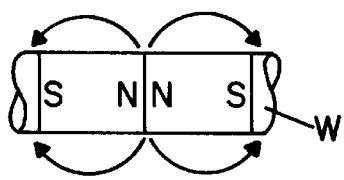

In the embodiment of FIG. 1, encoding unit 10 is operable to imprint magnetic pulses on wire W in response to the output of encoder 18 through line 26 to switch 14 and by which the switch is operated to connect coil 12 to power supply 16. As will be appreciated from FIGS. 2A and 2B, the reversed configuration of coil portion 12a and 12b relative to one another provides for the magnetic imprinting on wire W to have fields which produce local fringing of the flux to facilitate reading the coded information from the wire. The poles must line up either in a sequence of N-SS-N or a sequence of S-NN-S, and with the coil portions reversely wound as shown in FIG. 1, it will be appreciated that the sequences dependant on the direction of flow of current through coil 12. While a single coil having reversely wound coil portions is shown in FIG. 1, the desired flux fringing can be achieved using two coils.

Figure 3:
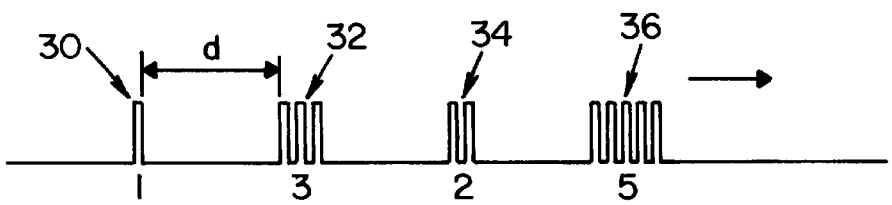
FIG. 3 schematically illustrates information encoded on the wire using Manchester encoding technology.
Figure 4:
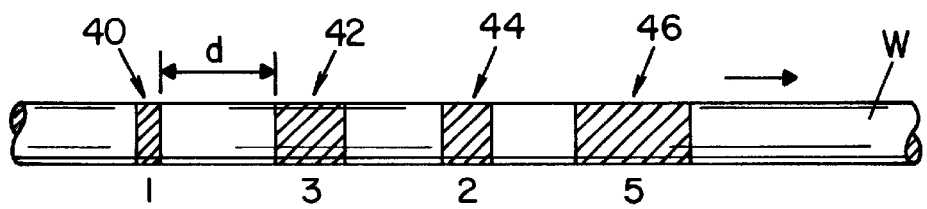
FIG. 4 schematically illustrates encoded information on the wire in the form of magnetic pulses of different pulse widths.
Figure 5:
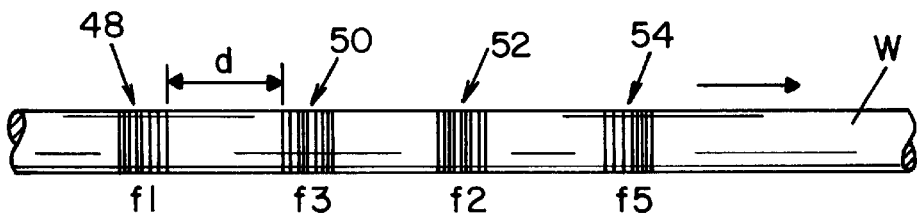
FIG. 5 schematically illustrates encoded information on the wire in the form of magnetic pulses of different frequency.

In the embodiment of FIGS. 1–5, the coded information imprinted on wire W is one or more sequentially imprinted magnetic pulses providing code segments which, in FIGS. 3–5, are designated by the numerals 1, 3, 2, and 5. It will be appreciated that each of these segments represent a different bit of information regarding wire W. As will be appreciated from the foregoing description of FIG. 1, counter 20 enables encoder 18 based on the timing of oscillator 22 and sets the time and thus the distance d between the sequentially imprinted code segments, and switch 14 is turned on and off in accordance with the output from encoder 18 through line 26 so as to imprint the magnetic pulse or pulses of each segment as well as to provide the distance d between the segments. Preferably, the information imprinted on wire W from encoder 18 and/or writer 23 is simultaneously outputted from encoder 18 through line 27 and encoded in a memory device 28 such as a Touch Memory button, RFID tag or card, or a bar code label or tag.

FIG. 3 shows a code imprinted on wire W by Manchester encoding technique and comprised of code segments 30, 32, 34, and 36 respectively comprised of 1, 3, 2, and 5 transitions from one magnetic polarity to the other, whereby it will be appreciated that the different number of transitions in each code segment represents a different bit of information pertaining to electrode W. FIG. 4 shows a code comprised of segments 40, 42, 44, and 46 each comprised of a magnetic pulse having a different pulse width in the direction of movement of the wire electrode. Based on the unit width of 1 for segment 40, segments 42, 44 and 46 respectively are multiples of the unit width by 3, 2 and 5. Again, each code segment represents a different bit of information regarding the welding wire. In FIG. 5, the code segments 48, 50, 52, and 54 are shown as magnetic pulses having different frequencies as represented by the designations f1, f3, f2, and f5. Again, the different segments represent different bits of information pertaining to the welding wire.

Figure 6:
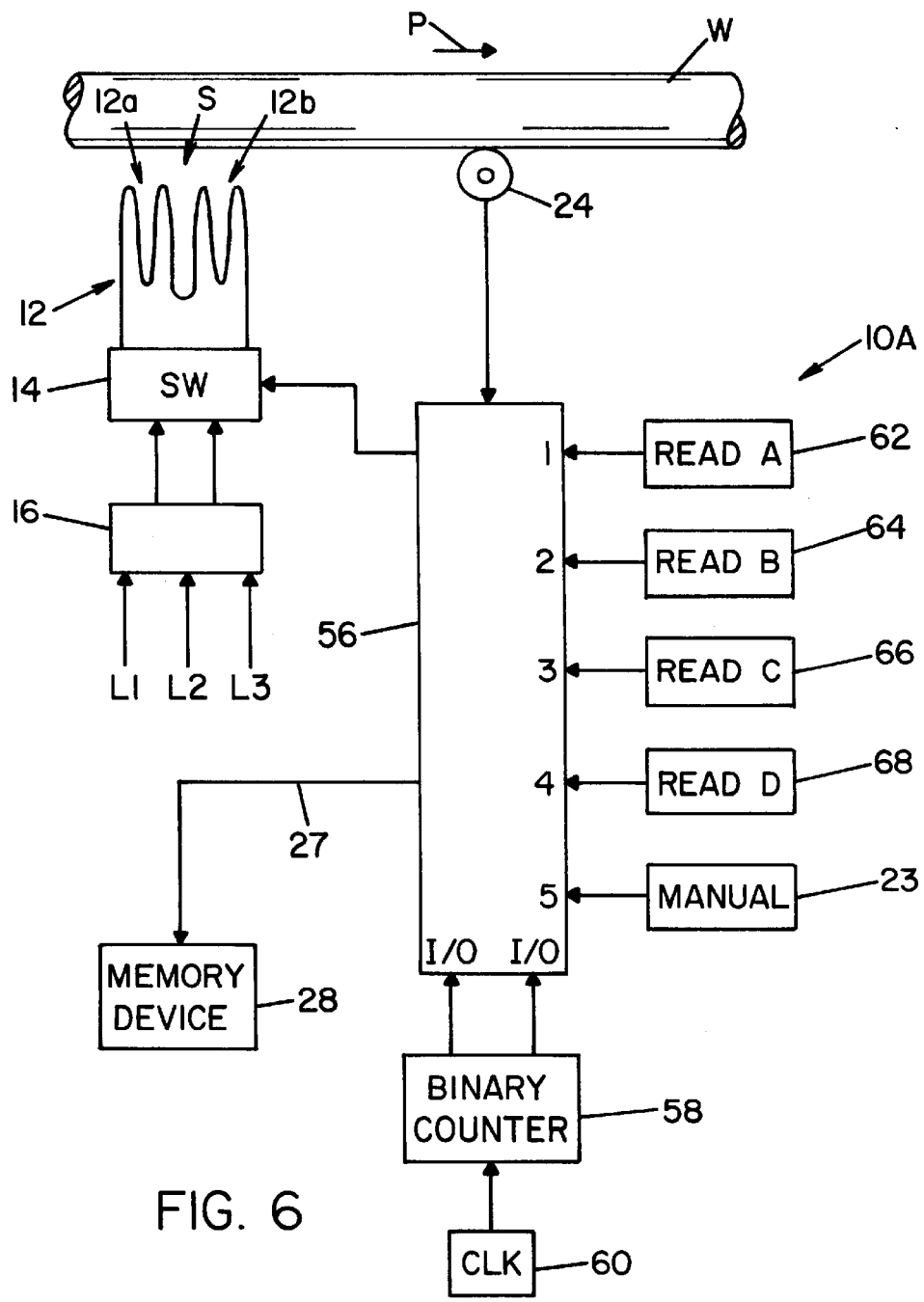
FIG. 6 schematically illustrates apparatus for magnetically imprinting a binary code on welding electrode wire.
Figure 7:
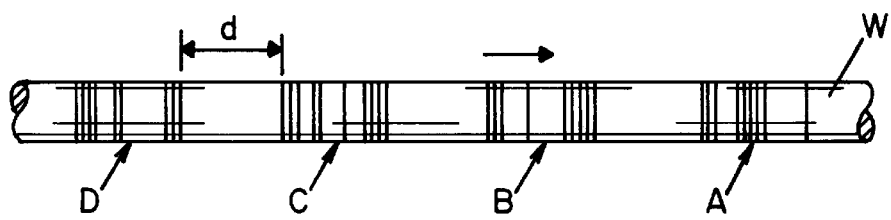
FIG. 7 schematically illustrates encoded information on the wire in the form of magnetic pulses having different binary values.

FIG. 6 illustrates an arrangement for imprinting a plurality of magnetic code segments on a welding wire and wherein the segments have different binary values such as different binary numbers. A number of components parts of the encoding arrangement shown in FIG. 6 correspond to those in the arrangement shown in FIG. 1, whereby the corresponding components are designated in FIG. 6 by the same numerals appearing in FIG. 1. In the embodiment of FIG. 6, encoding unit 10A comprises encoder 56, binary counter 58 and clock 60, and a series of code storing components 62, 64, 66, and 68 which respectively store binary codes A, B, C, and D for imprinting on welding wire W. Encoding unit 10A is activated in response to the movement of wire W along path P by movement sensing device 24 in the manner described hereinabove in connection with FIG. 1 and, when activated, operates to imprint binary codes A, B, C, and D on wire W as depicted in FIG. 7. In particular in this respect, clock 60 determines the space d between the code segments and counter 58 enables the sequential output of code segments A, B, C, and D from encoder 56 to switch 14 for imprinting on wire W. Further, as described in connection with FIG. 1, sensor 24 provides input to encoder 56 which enables the imprinting of tracking information on the wire. As with the code segments in FIGS. 3–5, each of the segments A, B, C, and D represents a bit of information pertaining to welding wire W. In this respect, and by way of example only, binary code A can identify the manufacturer and/or manufacturing location, and binary codes B, C and D can identify non-variable characteristics of the wire which are relevant to operating welding apparatus so as to obtain the highest quality work and optimum performance of the apparatus and which, in this respect, might identity the alloy of the wire, the specified wire diameter and a suitable welding procedure for the specified wire diameter. Again, codes A, B, C, and D provide a predetermined menu of information for encoding on the welding wire, and additional and/or other information pertaining to wire W can be encoded thereon through the use of writing device 23 in the manner and for the purpose set forth with respect thereto in connection with the description of FIG. 1. It will likewise be appreciated that the information imprinted on wire W can be recorded simultaneously on a memory device 28 as described hereinabove.

Figure 8:
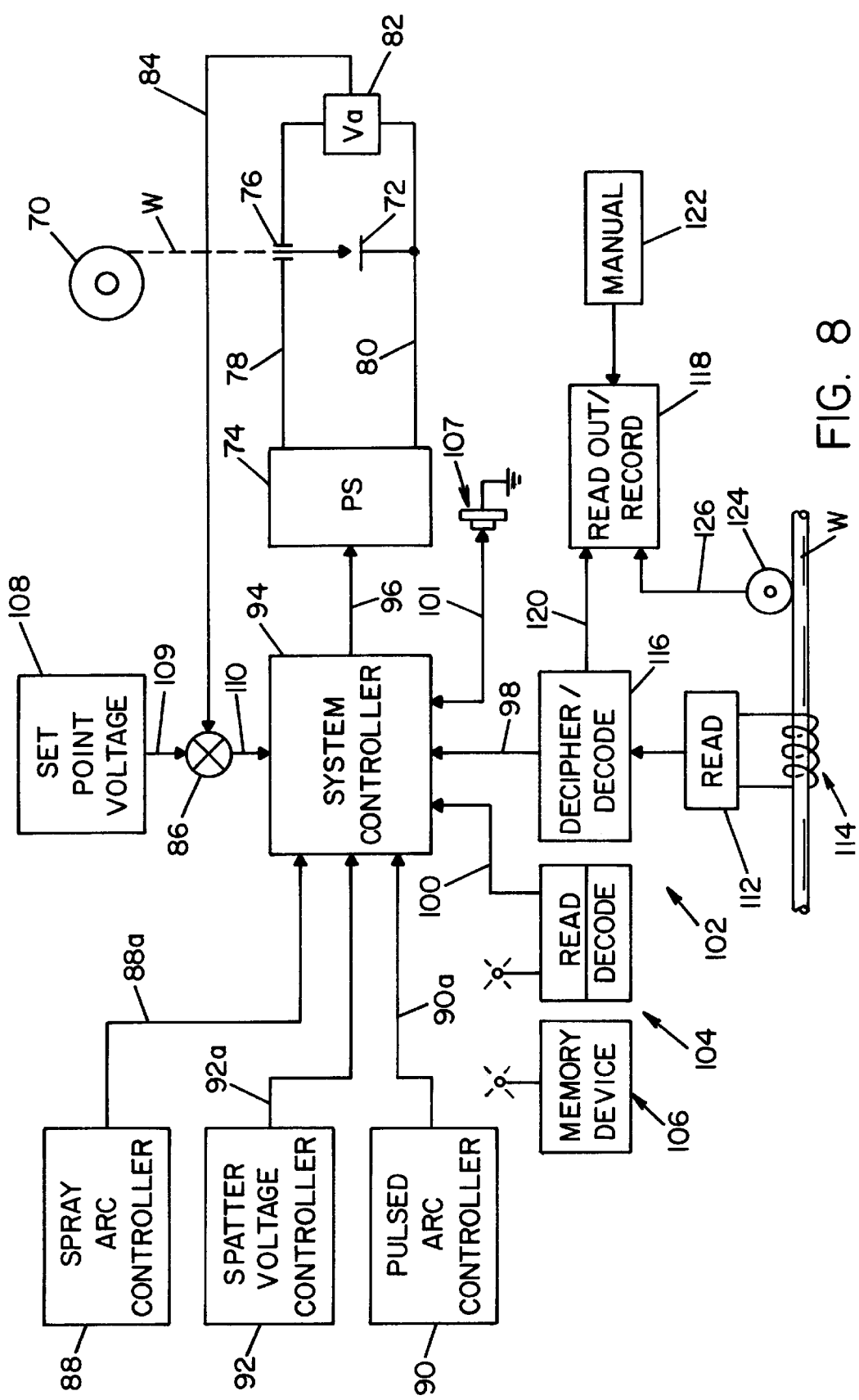
FIG. 8 is a block diagram schematically illustrating electric arc welding apparatus having different modes of operation and bar code and other reading and deciphering components for shifting the apparatus between the modes of operation.

FIG. 8 schematically illustrates the manner in which operating conditions and/or different operating modes in an electric arc welding process can be controlled in accordance with stored, coded information pertaining to a welding wire electrode to be used in the process. More particularly in this respect, FIG. 8 illustrates by way of example an electric arc welding system including a welding station to which electrode wire W is fed from a reel 70 and at which the electrode and a workpiece 72 are connected to power supply 74. More particularly in this respect, electrode wire W passes through a contact sleeve 76 connected to power supply 74 by a line or lead 78, and workpiece 72 is connected to the power supply by line 80. For determining the actual arc voltage Va, a voltage sensing device 82 is provided in series with lines 78 and 80 and has an output line 84 for directing the arc voltage signal to a comparator 86 for the purpose set forth hereinafter.

Figure 9:
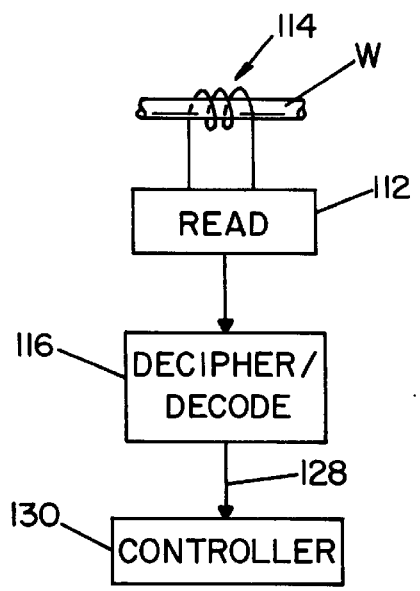
FIG. 9 is a block diagram schematically illustrating use of the code reading and deciphering components for controlling operating parameters of welding apparatus.

In FIG. 8, the welding system is shown as having a plurality of operating conditions including different operating modes which are controlled in accordance with the present invention as set forth hereinafter, and FIG. 8 in conjunction with FIG. 9 shows application of the present invention to controlling operating conditions in the form of operating parameters which can be controlled in conjunction with or independent of the operating modes. With reference first to FIG. 8, the welding system is shown, for purposes of example only, to be operable in a spray arc mode through a spray arc controller 88, in a pulsed arc mode through a pulsed arc controller 90, and in a spatter mode through a spatter voltage controller 92. Each mode controller is operable through a system controller 94 to output the corresponding control program to power supply 74 through line 96. More particularly in this respect, each of the controllers 88, 90 and 92 is operable to output a signal to system controller 94 through the corresponding output line 88a, 90a and 92a which signal corresponds to coded information pertaining to an electrode suitable for the corresponding mode of operation. Coded information pertaining to the electrode wire W on reel 70 is inputted to system controller 94 through a line 98 and/or a line 100 and/or a line 101. Lines 98 and 100 are respectively associated with a reading and decoding device 102 for reading coded information magnetically imprinted on wire W, and a reading and decoding device 104 for the non-contact reading of coded information on a memory device 106 which, while shown as an RFID tag or card, could be a bar code, or the like. Line 101 is associated with a Touch Memory button 107. System controller 94 is programmed to compare the coded information pertaining to wire W with the mode controller input signals, and when the input signal from one of the mode controllers is the same as the input signal pertaining to wire W the system controller is operable to connect the corresponding mode controller to power supply 74 for the welding process to operate in accordance with the control program for the corresponding mode. It should be noted at this point that no magnetic code on wire W or the absence of a memory device 106 or 107 is, for purposes of the present invention, a code which indicates to controller 94 that there is no information available from the electrode, or otherwise, pertaining to wire W. In accordance with the present invention, microprocessor controller 94 is operable in response to the absence of information pertaining to welding wire W or to information other than that pertaining to the available operating modes to shift the welding system to a voltage mode of operation in which the feedback arc voltage through line 84 to comparator 86 is compared therein with a reference voltage inputted thereto through line 109 from a set point voltage device 108 such as a potentiometer. Comparator 86 outputs a difference signal to system controller 94 through line 110, whereby controller 94 outputs a control signal through line 96 to 20 power supply 74 for the latter to appropriately adjust the arc voltage.

Reading unit 102 includes a reader 112 having a read coil 114 through which wire W passes, and it will be noted that the adjacent coil portions of coil 114 do not have to be reversely oriented as do the coil portions of encoder coil 12 described herein in connection with FIG. 1. The reading unit further includes a decipher/decode component 116 by which signals corresponding to the coded information extracted from wire W are inputted to microprocessor 94 through line 98. Preferably, a readout/record component 118 is provided at the point of use for receiving signals corresponding to the information extracted from wire W through line 120 and enabling a visual and/or printed output of the information. Information relative to the use of the wire, such as date and time information, operating personnel and the like can be input to the readout/record component 118 by a manually actuated writing component 122, and a wire actuated sensor 124 inputs information to readout/record component 118 through line 126 to enable tracking the amount of wire used, anticipating the location in the reel of wire of an anomaly such as a wire break, locations along the length of the wire where adjustment of the process is required to compensate for changes in wire diameter, and the like. Further, system controller 94 can write back to Touch Memory button 107 such as for tracking the amount of wire used, and the like. Another operating mode, not shown in FIG. 8, could be that of surface tension transfer welding using the STT welder of the Lincoln Electric Company of Cleveland, Ohio. In the STT process, the arc current wave shape is a controlled parameter and a particular wave shape is dependant on welding electrode wire characteristics.

In addition to shifting the welding apparatus between different operating modes as described above in connection with FIG. 8, the invention is also applicable to the control of welding process parameters in connection with a given mode of operation of the welding apparatus. Such parameters include, for example, wave shape in connection with STT welding, welding wire feed speed, arc current, arc voltage, gas flow rate, arc length or gap, and the like. Thus, as will be appreciated from FIG. 9, the information pertaining to wire W which is extracted by reader 112 and deciphered and decoded in component 116 can be outputted through a line 128 directly to a controller 130 for adjusting the corresponding parameter of the welding process. Likewise, it will be appreciated that such information encoded on a memory device 106 or 107 as described above can be outputted from read/decode device 104 directly to a parameter controller 130. While the foregoing description is with respect to automatic control of the welding apparatus or process based on the extraction of coded information from devices including the welding wire, it will be appreciated that the extracted information inputted to read out/record device 118 can be used by an operator of the apparatus to manually select the appropriate mode of operation and/or to manually adjust operating parameters of the process and apparatus.

Figure 12:
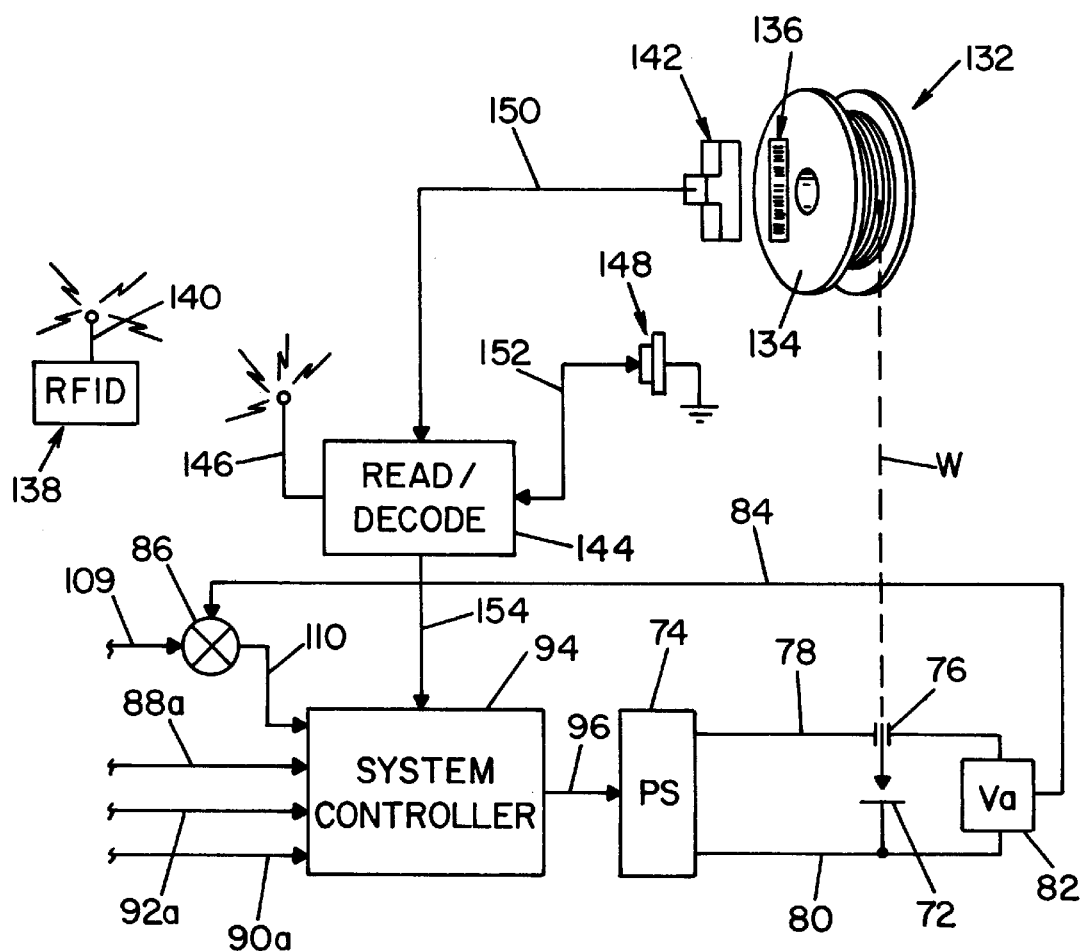
FIG. 12 is a block diagram similar to FIG. 8 and schematically illustrating the control of welding apparatus using encoded devices including a bar code, RFID tag and Touch Memory button.
Figure 10:
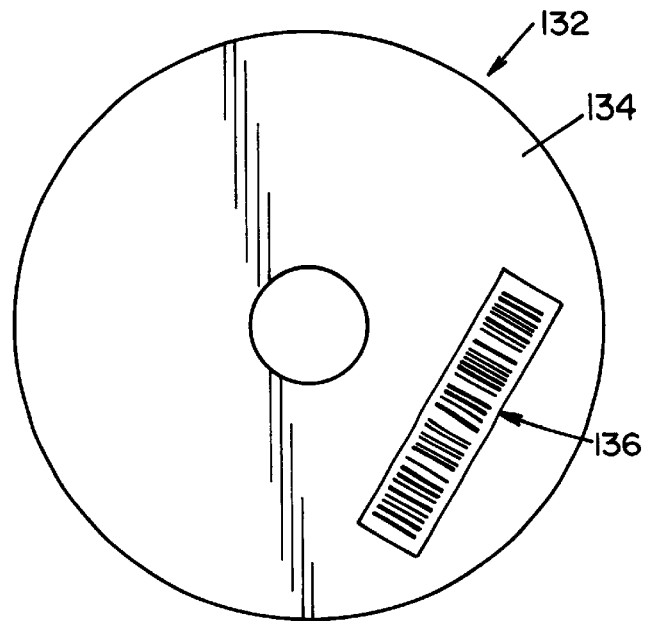
FIG. 10 is an end elevation view of a welding wire reel provided with a bar code for providing information pertaining to welding wire wound on the reel.
Figure 11:
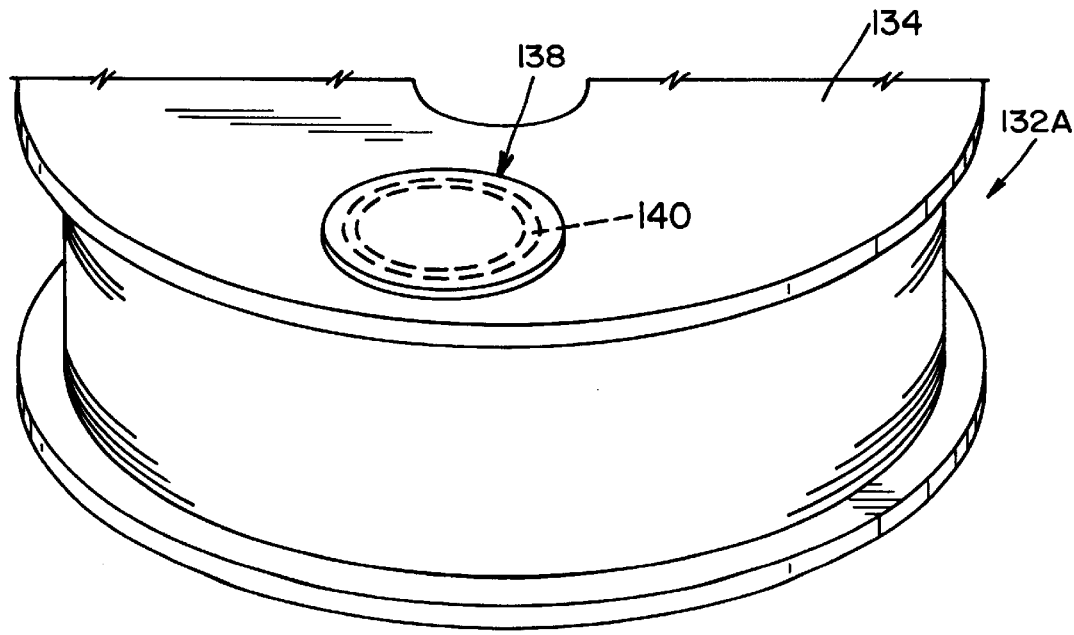
FIG. 11 is a perspective view of a portion of one end flange of a welding wire reel illustrating an RFID tag thereon for providing information pertaining to the wire on the reel.

FIGS. 10 and 11 illustrate welding wire reels 132 and 132A, respectively, having a flange 134 provided with non-contact type memory devices of the character described and discussed hereinabove and containing information pertaining to the welding wire on the reel. In the embodiment of FIG. 10, the memory device is a bar code in the form of a label 136 securely attached to flange 134 such as by an adhesive bond, and in the embodiment of FIG. 11, the memory device is an RFID tag or button 138 attached to flange 134 and having an enclosed coil antenna 140. FIG. 12 schematically illustrates the use of bar code 136 and RFID device 138 in connection with controlling the operating mode for the welding system shown and described hereinabove in connection with FIG. 8. Accordingly, corresponding parts of the welding system illustrated in FIG. 8 are designated by the same numerals in FIG. 12, wherein it will be appreciated that signal lines 88*a*, 90*a* and 92*a* are respectively connected to the spray arc controller, pulsed arc controller and spatter voltage controller components shown in FIG. 8 and that signal line 109 is connected to the set point voltage component 108 in FIG. 8.

In FIG. 12, a bar code reader 142 is positioned to read bar code 136 on reel 132 which, while not shown in detail, is in its mounted position on the welding apparatus. FIG. 12 also shows a reader/decoder 144 having an antenna 146 for communicating with RFID tag 138 which, while not shown for purposes of clarity would be on a wire reel as shown in FIG. 11. Further, FIG. 12 shows a Touch Memory button 148 which, as will become apparent hereinafter, can be mounted on a wire reel such as reel 132 for providing information pertaining to the wire. Reader 142 is connected to read/decode component 144 by line 150 and Touch Memory button 146 is connected to the read/decode component by line 152, whereby the information pertaining to electrode wire W extracted from the corresponding memory device is transmitted to and decoded in component 144 and then outputted through line 154 to system controller 94 as a control signal for determining the mode of operation of the arc welding system. Again, while not shown, the memory and reading devices in FIG. 12 can operate to control operating parameters in connection with a given mode of operation of the welding process as described hereinabove in connection with FIG. 9. Furthermore, as described in connection with FIG. 8, the information extracted from the encoded device can be displayed and/or printed to enable manual selection of a mode of operation and/or manual adjustment of operating parameters by the operator of the welding apparatus.

FIG. 13 illustrates reel 132A mounted on a reel support 156 which can be associated with welding apparatus and a wire feeding mechanism associated therewith. As will be appreciated from the foregoing description regarding FIG. 11, RFID tag 138 is mounted on one of the reel flanges 134 radially outwardly from the axis of rotation of the reel, and a reader 158 for the RFIID tag is supported adjacent the reel flange and in a radially outward position relative to reel support 156 which provides for the reader to be aligned with the RFID tag. As will be appreciated from FIGS. 13, 13A and 13B, and as is well known in connection with RFID memory devices, reader 158 produces a low level radio frequency magnetic field transmitted from the reader antenna to the RFID tag as indicated by arrow A in FIGS. 13 and 13B. The antenna in RFID tag 138 receives the magnetic field signal of the reader and converts it to an electrical form by which the integrated circuit in the RFID device is powered. The memory contents in the integrated circuit are then transmitted by the RFID tags antenna back to the reader in an altered form of the magnetic field from the reader as indicated by arrow B in FIGS. 13A and 13B. The electromagnetic signal denotes the data stored in the tag memory, and the data is decoded and transmitted from the reader via line 160 to the system controller as stated hereinabove in connection with FIG. 12.

Figure 14:
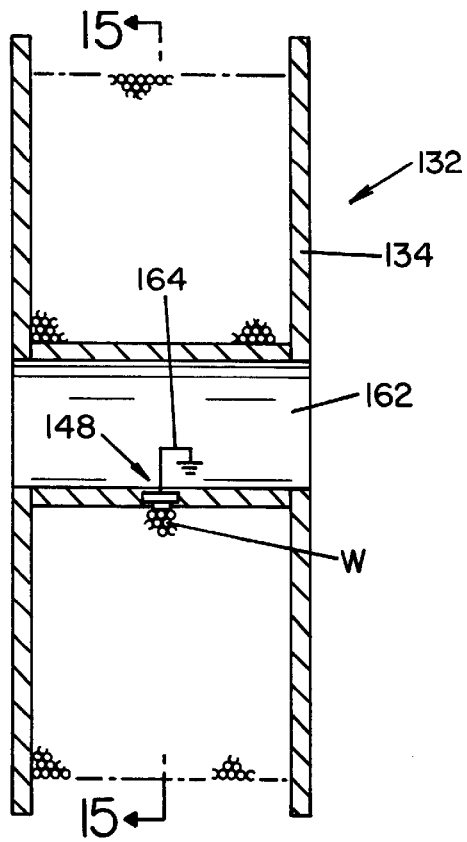
FIG. 14 is a sectional elevation view of a welding wire reel showing a Touch Memory button mounted on the hub thereof.
Figure 15:
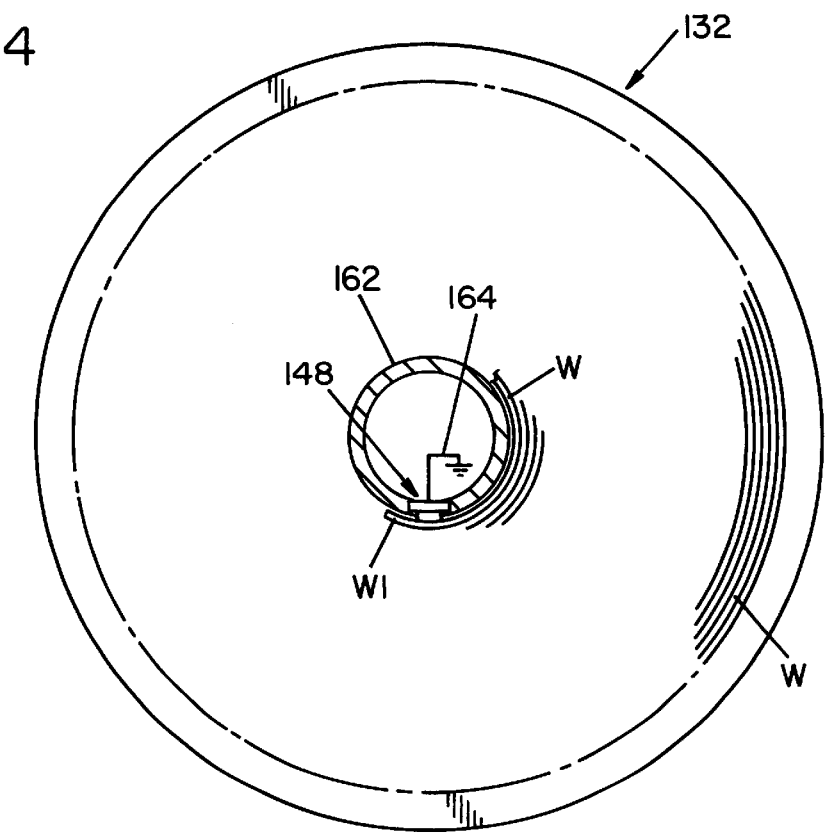
FIG. 15 is a cross-sectional elevation view of the reel taken along line 15—15 in FIG. 14.
Figure 16:
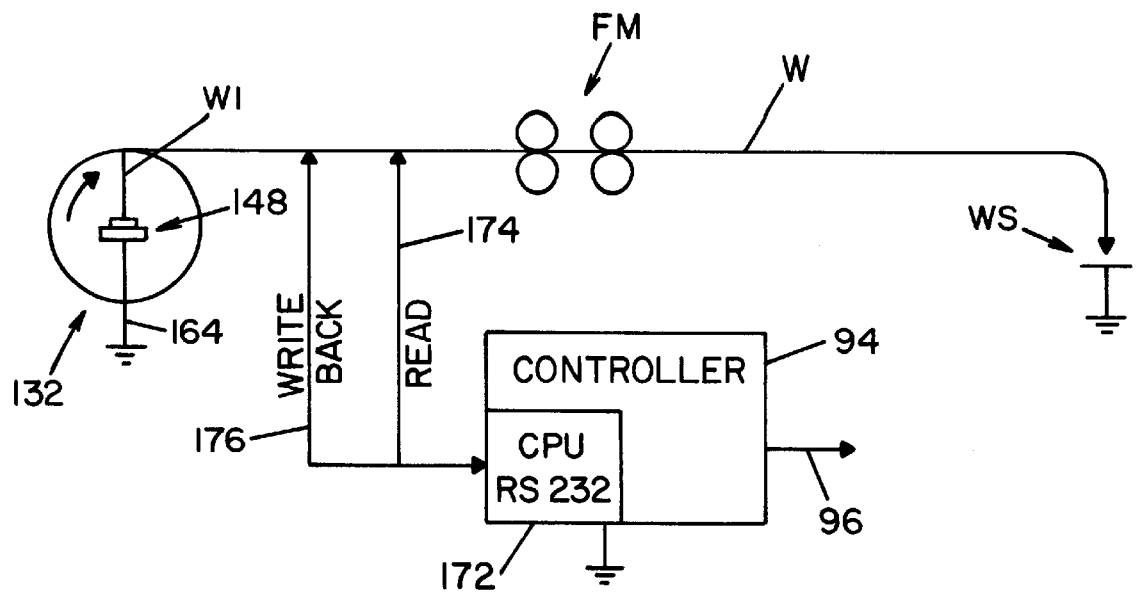
FIG. 16 schematically illustrates the read/write circuit between the Touch Memory button, welding wire and controller for the Touch Memory arrangement shown in FIGS. 14 and 15.
Figure 17:
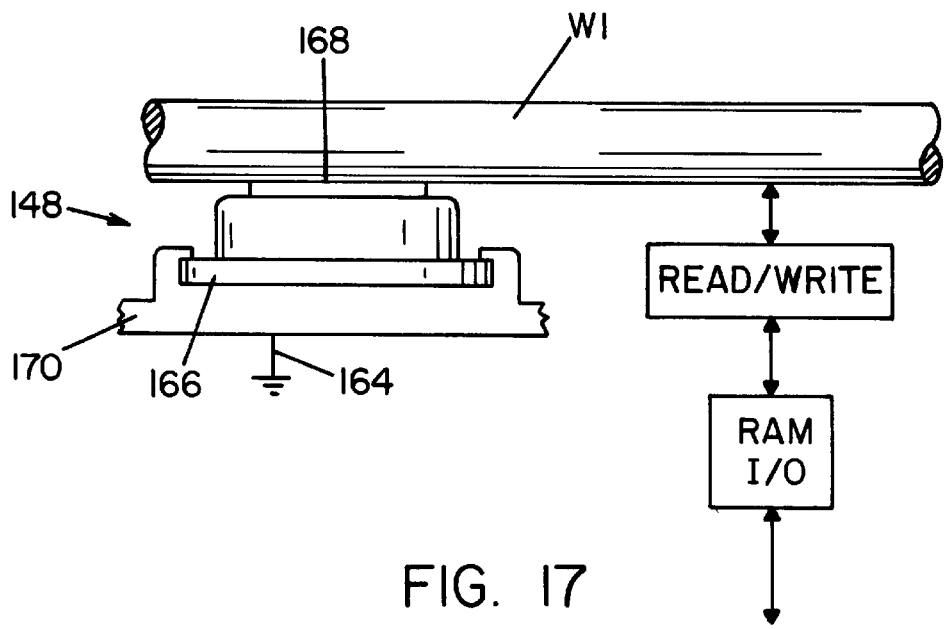
FIG. 17 is an enlarged illustration of the Touch Memory button and welding wire and schematically illustrating the read/write circuitry.

As mentioned hereinabove, Touch Memory button 148 can be mounted on a wire reel for both reading and writing of information pertaining to the wire on the reel, and FIGS. 14 and 15 show one structural arrangement for this purpose. More particularly in this respect, Touch Memory button 148 is mounted in a recess therefor in hub 162 of reel 132, and wire W wound on the reel includes a remote or inner end W1 disposed in electrical contact with the contact or touch side of the button. As is well known, the contact side of the button is adapted to be placed in contact with a low voltage source of up to five volts and across ground 164 to activate the button's memory and, as will become apparent hereinafter, wire W provides read/write line 152 in FIG. 12. More particularly in this respect, as will be appreciated from FIGS. 16 and 17 of the drawing, Touch Memory button 148 basically comprises a semiconductor memory chip, not shown, packaged in a two piece stainless steel canister having a base 166 which includes a mounting flange and provides ground 164, and a touch or contact surface 168 which, as shown in FIGS. 15 and 17, is engaged by remote end W1 of the welding wire wound on the reel. The memory button may, for example, be attached to the hub of reel 132 by a metal mounting component 170 which engages flange 166 and which, as will be apparent from FIG. 17, then provides ground 164 for the memory circuit. As shown in FIG. 16, welding wire W is payed from reel 132 to a welding station WS by a wire feeding mechanism FM, and a central processing unit 172 for the Touch Memory button is operable in conjunction with system controller 94 to output a five volt signal to wire W for activating Touch Memory button 148 through wire end W1 and ground 164. Thereupon, data stored in button 148 can be read by processing unit 172 through line 174 and the processing unit can write back to button 148 through line 176. This advantageously enables maintaining, for example, a record of the amount of wire used and, thus, the amount of wire remaining on the reel at any given time. As another example, the data in the memory of Touch Memory button 148 can include information relevant to locations along the length of the wire at which the welding process should be altered to accommodate, for example, changes in wire diameter whereby, at such locations, controller 94 can make the necessary adjustments through output line 96.

Figure 18:
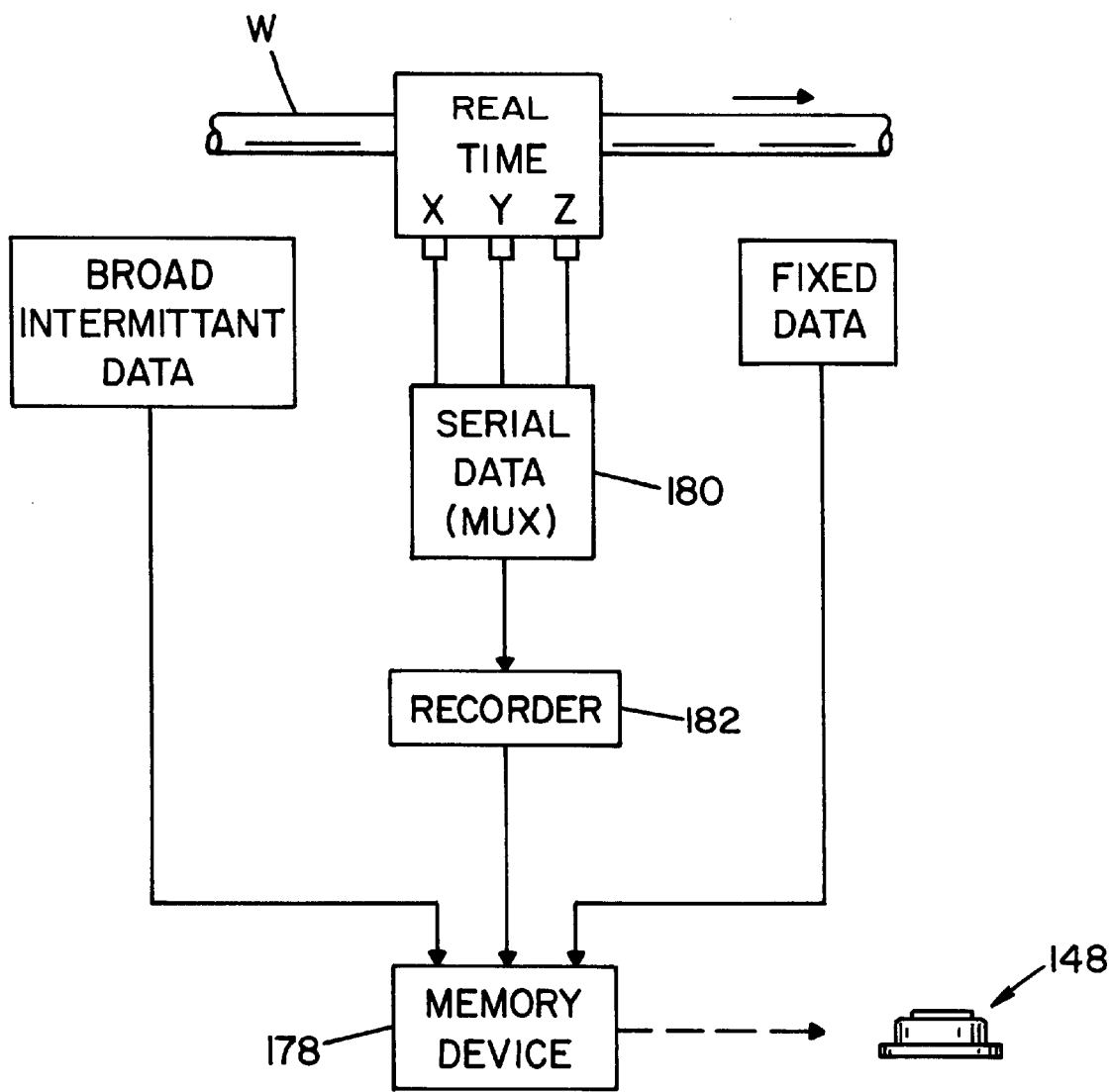
FIG. 18 is a block diagram showing the encoding of information to a memory device.

As will be appreciated from FIG. 18, a memory device 178 which can be the memory component of an RFID tag or a Touch Memory button 148, as shown in FIG. 18, can be encoded with a variety of data at the time of and in connection with manufacturing of wire W. As shown in FIG. 18, such data can include fixed data which, for a given welding wire, does not vary from one reel or barrel to the next such as, for example, the manufacturer's name, the product name, trademark/copyright information, and the like. Intermittent data which relates to a given welding wire and which may vary from one reel or barrel to the next can also be encoded in the memory device including, for example, wire chemistry, a specified wire diameter, the date and time of manufacture, the manufacturing location, and the like. Real time data which needs to be recorded and encoded in the memory device at the time of and in connection with manufacturing of the wire includes, for example, the length of wire on a reel or in a barrel, the actual diameter of the wire at locations along the length thereof, areas along the length of the wire at which an out-of-round condition exists, areas in which the wire is twisted or wound, the location or locations of anomalies such as a wire break and the like. As will be appreciated from FIG. 18, the latter types of data are processed in a multiplexer 180, serially arranged and recorded in a recorder 182 and then serially encoded in memory device 178. Further information which can be encoded in the memory device for a given welding wire on a reel or in a barrel relates to welding programs and procedures by which, through the process controller 94, welding apparatus is controlled to execute a program read from the memory and which may include, for example, the control of such process parameters as an arc voltage, arc current, arc length, gas flow rate, wire feed rate, globular to spray break over voltage and the like.

Figure 19:
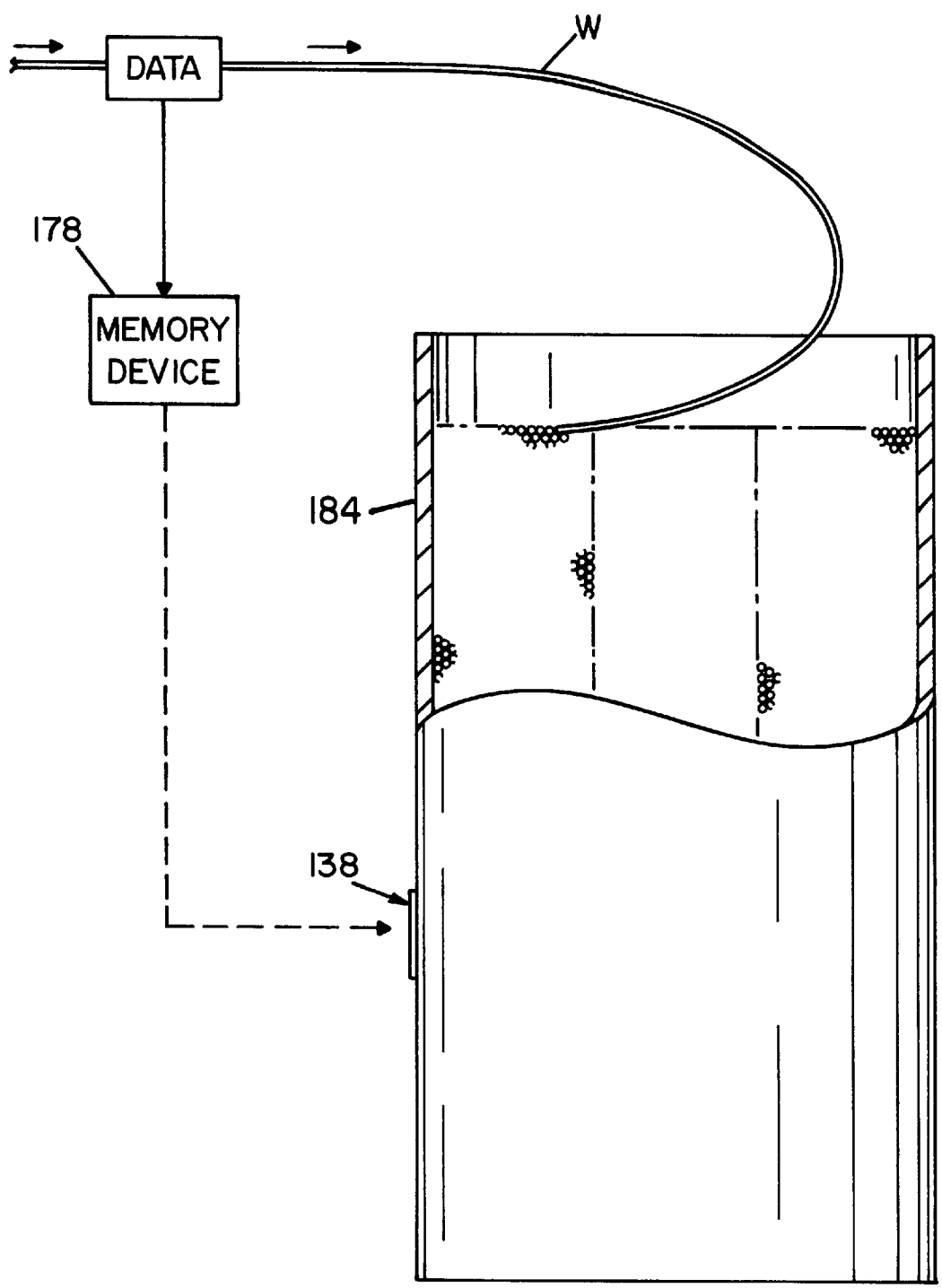
FIG. 19 schematically illustrates the encoding of data into an RFID tag applied to a welding wire storage barrel; and, FIG. 20 schematically illustrates an RFID system in connection with controlling a welding process and maintaining inventory management with respect to electrode wire and shielding gas used in the process.

While the description hereinabove is with respect to the encoding of information in the memory of an RFID plate or tag or a Touch Memory button for application to a reel of welding wire, it will be appreciated as schematically shown in FIG. 19, that data corresponding to that described in connection with FIG. 18 can be encoded in memory device 178 in connection with the manufacturing of wire W which is wound into a barrel or drum 184 as opposed to being wound on a reel. As mentioned above in connection with FIG. 18, memory device 178 can be the memory component of an RFID tag such as tag 138 described hereinabove and which, following the wire manufacturing process, would be applied to the side of drum 184. In connection with the use of the drum of wire, the information stored in the memory of tag 138 can be read by an appropriate reader and, if the tag is read/write, it can be written to during use of the wire so as to maintain a record of the amount of wire left in the drum at any given time. Still further, while RFID tag 138 is shown in connection with drum 184, it will be appreciated from the description herein that memory device 178 could be the memory component of a Touch Memory button mounted on or in the barrel and having appropriate connections for the touch surface and ground for accessing the read/write functions thereof.

Figure 20:
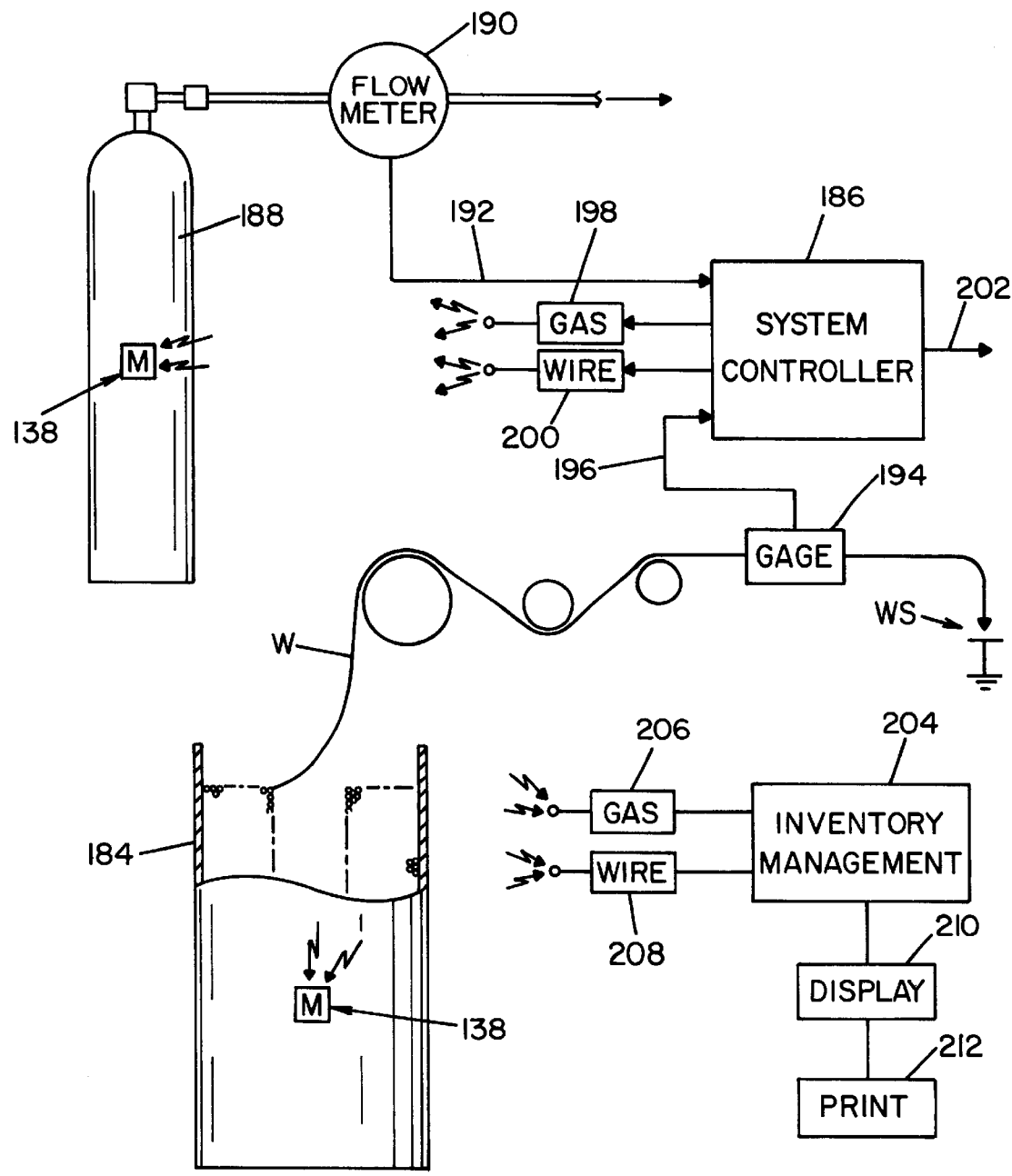

FIG. 20 schematically illustrates the use of RFID tags in connection with controlling a welding process and maintaining an inventory of wire and shielding gas usage in connection therewith. While RFID devices are shown, it will be appreciated that the same process control and consumables inventory maintenance can be achieved using Touch Memory devices. More particularly in this respect, FIG. 20 schematically illustrates a welding system including a system controller 186, a welding wire supply barrel 184 having an RFID tag 138 thereon as described above in connection with FIG. 19, a shielding gas tank 188 having an RFID tag 138 mounted thereon, and a welding station WS to which the welding wire and gas are delivered in connection with performing the welding process. The memory component in RFID tag 138 on tank 188 includes data regarding the amount of gas initially in the tank, and a flow meter 190 is operable during the welding process to output a signal through line 192 to system controller 186 which is indicative of the gas flow rate and thus the quantity of gas used. Wire W is fed to welding station WS through a gage 194 which is operable during the welding process to transmit a signal through line 196 to system controller 186 which is indicative of the feed rate and thus the length of welding wire used. System controller 186 includes a reader 198 for RFID tag 138 on gas tank 188, and a reader 200 for RFID tag 138 on wire barrel 184. In response to the inputs to system controller 186 through lines 192 and 196, readers 198 and 200 respectively write back to RFID tag 138 on tank 188 and RFID tag 138 on barrel 184 to change the corresponding memory for the latter to reflect the usage and provide the current quantity of gas and wire in the respective container. Furthermore, based on the information stored in the memory of RFID tag 138 on wire barrel 184 as described above in connection with FIGS. 18 and 19, system controller 186 is operable through an output line 202 to the welding power supply, gas flow control and wire feeding devices, not shown, to adjust the wire feed speed, gas flow rate and other welding parameters in accordance with the data in the memory component of the RFID tag pertaining to the welding wire.

Further in connection with FIG. 20, an inventory management center 204 is provided with a reader 206 for RFID tag 138 on gas tank 188, and a reader 208 for RFID tag 138 on wire barrel 184. As indicated by the directional arrows in connection with the reader antennas, these readers respectively receive data from the RFID tags on tank 188 and barrel 184 reflecting current quantities of gas and wire in the respective receptacles. This information is transmitted to the inventory management center 204, and the information is available therefrom visually such as on a television screen as indicated by block 210 and/or by printout as indicated by block 212.

While considerable emphasis has been placed herein on preferred embodiments of the invention, it will be appreciated that other embodiments can be devised and that many changes can be made in the preferred embodiments without departing from the principles of the invention. Accordingly, it is to be distinctly understood that the foregoing descriptive matter is to be interpreted merely as illustrative of the invention and not as a limitation.

Having thus described the invention, it is so claimed:

1. A method of controlling an electric arc welding process having a plurality of operating conditions and wherein a welding wire is advanced toward a workpiece and a welding arc is established between the advancing wire and the workpiece, including:
   a) providing a stored source of coded information pertaining to variations along the length of a welding wire to be used in an electric arc welding process;
   b) scanning the stored source for extracting coded information therefrom pertaining to variations along the length of the wire; and,
   c) controlling at least one of the plurality of operating conditions of said process in accordance with the extracted information.

2. The method according to claim 1, wherein said operating conditions include first and second operating modes for the process and said extracted information includes one of first and second codes respectively pertaining to said first and second operating modes, said method including:
   d) operating said process in said first mode in response to said extracted information being said first code; and,
   e) operating said process in said second mode in response to said extracted information being said second code.

3. The method according to claim 1, wherein said stored source of coded information at least one of a bar code, RFID component, an IC component, and a semi-conductor memory chip.

4. The method according to claim 1, wherein said stored source of coded information is magnetically imprinted on the welding wire.

5. The method according to claim 1, wherein said stored source of coded information is one of an RFID component, a semi-conductor memory chip and an IC component.

6. The method according to claim 1, including:
   d) comparing the extracted information with preselected information; and,
   e) controlling said at least one operating condition based on said comparison.

7. The method according to claim 6, wherein said operating conditions include first and second operating modes for the process and said extracted and preselected information respectively provide first and second codes, said method including:
   f) operating said process in said first mode when said first and second codes are the same; and,
   g) operating said process in said second mode when said first and second codes are different.

8. The method according to claim 1, including:
   d) providing said coded information on a component mounted on a container for said wire; and,
   e) scanning the component on said container for extracting information therefrom pertaining to the wire.

9. The method according to claim 8, wherein said component is one of a bar code, RFID tag and a semi-conductor memory chip.

10. The method according to claim 1, wherein said welding process is a surface tension transfer process having operating parameters including arc current wave shape, and adjusting the arc current wave shape in accordance with the extracted information.

11. A system for controlling an electric arc welding process wherein a welding wire is advanced toward a workpiece and a welding arc is established between the advancing wire and the workpiece comprising, a stored source of coded information pertaining to variations along the length of said wire, a code scanner to scan said source and output a signal indicative of coded information thereon pertaining to variations along the length of wire said wire, and a controller operating the welding process in accordance with said signal.

12. A system according to claim 11, wherein the outputted signal is a first signal, a memory device providing a second signal indicative of desired information pertaining to a welding wire, and a comparator for comparing said first and second signals, said comparator outputting a first control signal when said first signal and said second signal are the same and a second control signal when said first signal and said second signal are different.

13. A system according to claim 12, wherein said welding process has first and second modes of operation, and means responsive to said first and second control signals for respectively shifting said process between said first and second modes of operation.

14. A system according to claim 11, wherein said stored source of information is one of the welding wire, an RFID component and a semi-conductor memory chip, and decoding means for receiving and decoding the outputted signal.

15. A system according to claim 14, wherein said welding process has a plurality of operating parameters, said coded information including information pertaining to at least one of said parameters, control means for controlling the operation of said process, and said decoding means outputting a control signal to said control means indicative of said information pertaining to said at least one parameter.

16. A system according to claim 11, wherein the outputted signal is a first signal indicative of an actual characteristic of said wire, a memory device to provide a second signal indicative of a desired characteristic for the wire, and a comparator for comparing said first and second signals and outputting first and second control signals respectively when said first and second signals are the same and different.

17. A system according to claim 16, wherein said process is selectively operable in a first mode and in a second mode, means responsive to said first and second control signals for shifting operation of said process between said first and second modes for said process to operate in one of said first and second modes when said first and second control signals are the same and to operate in the other mode when said first and second control signals are different.

18. A system according to claim 11, wherein said welding process is a surface tension transfer process having operating parameters including arc current wave shape, said coded information including information pertaining to at least said arc current wave shape parameter, and said outputted signal being indicative of said information pertaining to said arc wave shape.

19. A system according to claim 18, further including control means for controlling said process, and means for outputting said signal to said control means for adjusting the arc current wave shape.

20. A method of controlling an electric arc welding process having a plurality of operating conditions and wherein a welding wire is advanced toward a workpiece and a welding arc is established between the advancing wire and the workpiece, including:
 a) scanning the advancing wire for coded information pertaining to variations along the length of the wire; and,
 b) controlling at least one of the plurality of operating conditions in response to the information extracted from the wire.

21. The method according to claim 20, wherein said operating conditions include first and second operating modes for the process and the information extracted includes one of first and second codes respectively pertaining to said first and second operating modes, said method including:
 c) operating said process in said first mode in response to said extracted information being said first code; and,
 d) operating said process in said second mode in response to said extracted information being said second code.

22. The method according to claim 20, including:
 c) comparing the extracted information with preselected information; and,
 d) controlling said at least one operating condition based on said comparison.

23. The method according to claim 22, wherein said operating conditions include first and second operating modes for the process and said extracted and preselected information respectively provide first and second codes, said method including:
 e) operating said process in said first mode when said first and second codes are the same; and,
 f) operating said process in said second mode when said first and second codes are different.

24. The method according to claim 20, wherein said process is a surface tension transfer process having operating parameters including arc current wave shape, and adjusting said arc current wave shape in response to the information extracted from said electrode.

25. A system for operating an electric arc welding process having a plurality of modes of operation and wherein a welding wire is advanced toward a workpiece and a welding arc is established between the advancing wire and the workpiece comprising, a memory device with a stored coded information pertaining to variations along the length of said wire, and a scanner to scan said source and outputting a signal indicative of coded information thereon pertaining to said wire.

26. A method of controlling an electric arc welding process having a plurality of operating conditions and wherein a welding wire is advanced toward a workpiece and a welding arc is established between the advancing wire and the workpiece, including:
 a) providing a stored source of coded information pertaining to welding wire to be used in an electric arc welding process;
 b) scanning the stored source for extracting coded information therefrom pertaining to the wire; and,
 c) controlling at least one of the plurality of operating conditions of said process in accordance with the extracted information, wherein said stored source of coded information is magnetically imprinted on the welding wire and further wherein said scanning is for extracting coded information on said wire in the form of at least one code segment of one of a pulse count, a pulse width, a pulse frequency, and a binary value.

27. The method according to claim 26, wherein said coded information includes at least two code segments having different pulse counts.

28. The method according to claim 26, wherein said coded information includes at least two code segments having different pulse widths.

29. The method according to claim 26, wherein said coded information includes at least two code segments having different pulse frequencies.

30. The method according to claim 26, wherein said coded information includes at least two code segments having different binary values.

31. A method of controlling an electric arc welding process having a plurality of operating conditions and wherein a welding wire is advanced toward a workpiece and a welding arc is established between the advancing wire and the workpiece, including:
 a) providing a stored source of coded information pertaining to variations along the length of a welding wire to be used in an electric arc welding process;
 b) scanning the stored source for extracting coded information therefrom pertaining to variations along the length of the wire;
 c) controlling at least one of the plurality of operating conditions of said process in accordance with the extracted information;
 d) providing said coded information on said welding wire; and,
 e) scanning the advancing wire for extracting coded information therefrom pertaining to the wire.

32. A method of controlling an electric arc welding process having a plurality of operating conditions and wherein a welding wire is advanced toward a workpiece and a welding arc is established between the advancing wire and the workpiece, including:
 a) scanning the advancing wire for coded information pertaining to variations along the length of the wire; and,
 b) controlling at least one of the plurality of operating conditions in response to the information extracted from the wire wherein said coded information includes at least one code segment of one of a pulse count, a pulse width, a pulse frequency, and a binary value.

33. The method according to claim 32, wherein said coded information includes at least two code segments having different pulse widths.

34. The method according to claim 32, wherein said coded information includes at least two code segments having different pulse widths.

35. The method according to claim 32, wherein said coded information includes at least two code segments having different pulse frequencies.

36. The method according to claim 32, wherein said coded information includes at least two code segments having different binary values.

37. A system for controlling the operation of electric arc welding apparatus wherein a welding wire is advanced toward a workpiece and a welding arc is established between the advancing wire and the workpiece comprising, means for scanning said wire and outputting a signal indicative of coded information thereon pertaining to said wire, and control means for controlling the operation of the welding apparatus in accordance with said signal, wherein said coded information includes code segments and the outputted signal is representative of at least one code segment, and a decoder for receiving and decoding at least one code segment.

38. A system according to claim 37, wherein said welding apparatus has a plurality of operating parameters, said at least one code segment including information pertaining to at least one of said parameters, and said decoder outputting a control signal to said controller indicative of said information pertaining to said at least one parameter.

39. A method of controlling an electric arc welding process having a plurality of operating conditions and wherein a welding wire is advanced toward a workpiece and a welding arc is established between the advancing wire and the workpiece, including:

a) scanning the advancing wire for coded information pertaining to the wire; and, b) selecting one of the plurality of operating conditions in response to the information extracted from the wire wherein the coded information is in a semi-conductor memory chip in electrical contact with a remote end of said advancing wire.

\* \* \* \* \*